US007949905B2

(12) United States Patent
Sharma et al.

(10) Patent No.: US 7,949,905 B2
(45) Date of Patent: May 24, 2011

(54) APPARATUS AND METHOD FOR DYNAMICALLY DETECTING IMPROPER CONFIGURATION DATA PROVIDED IN A NETWORK

(75) Inventors: Manish Sharma, Bangalore (IN); Olavi A. Kamppari, Lower Gwynedd, PA (US); W. Russell Massey, Levittown, PA (US)

(73) Assignee: Honeywell International Inc., Morristown, NJ (US)

( * ) Notice: Subject to any disclaimer, the term of this patent is extended or adjusted under 35 U.S.C. 154(b) by 602 days.

(21) Appl. No.: 11/973,535

(22) Filed: Oct. 9, 2007

(65) Prior Publication Data
US 2009/0094491 A1    Apr. 9, 2009

(51) Int. Cl.
*G06F 11/00* (2006.01)
(52) U.S. Cl. ............................................ 714/49; 714/25
(58) Field of Classification Search .................. 714/25, 714/43, 49; 709/229
See application file for complete search history.

(56) References Cited

U.S. PATENT DOCUMENTS

| 5,790,397 | A  | * | 8/1998  | Bissett et al. ................. 700/2 |
| 7,254,630 | B1 | * | 8/2007  | Daude et al. ................ 709/224 |
| 7,640,340 | B1 | * | 12/2009 | Stapp et al. ................. 709/224 |
| 7,693,966 | B2 | * | 4/2010  | Schmid ....................... 709/220 |
| 2003/0005097 | A1 | * | 1/2003  | Barnard et al. ............. 709/223 |
| 2003/0177412 | A1 | * | 9/2003  | Todd ............................ 714/25 |
| 2003/0208589 | A1 |   | 11/2003 | Yamamoto |
| 2004/0044757 | A1 |   | 3/2004  | Baker |
| 2007/0027963 | A1 | * | 2/2007  | Cors et al. ................... 709/220 |
| 2007/0055853 | A1 | * | 3/2007  | Hatasaki et al. ................. 713/1 |
| 2009/0070474 | A1 | * | 3/2009  | Aura et al. .................. 709/228 |

FOREIGN PATENT DOCUMENTS

| JP | 2006-134259 | 5/2006 |
| WO | WO 2004/109977 A1 | 12/2004 |

OTHER PUBLICATIONS

Wikipedia, "Dynamic Host Configuration Protocol", Sep. 22, 2007, 13 pages.
Supplementary European Search Report dated Dec. 17, 2010 in connection with European Patent Application No. EP 08 83 7852.

* cited by examiner

*Primary Examiner* — Joshua A Lohn
(74) *Attorney, Agent, or Firm* — Munck Carter, LLP (57) ABSTRACT

A system (such as a process control system or communication system) includes one or more sources of configuration data (such as one or more BootP or DHCP servers). A testing mechanism transmits one or more requests for configuration data over a network. One or more sources of configuration data may respond to the requests, such as by providing configuration data (like IP addresses or NTP parameters) to the testing mechanism. The testing mechanism uses the response(s) to identify problems with the sources of configuration data. For example, if responses are received from multiple sources of configuration data, the testing mechanism could generate a notification indicating that a problem exists when the responses contain inconsistent configuration data. Also, if no responses are received, the testing mechanism could generate a notification indicating that a problem exists since no configuration data has been received. Any other or additional problems could also be detected.

24 Claims, 4 Drawing Sheets

APPARATUS AND METHOD FOR DYNAMICALLY DETECTING IMPROPER CONFIGURATION DATA PROVIDED IN A NETWORK

TECHNICAL FIELD

This disclosure relates generally to communication networks and more specifically to an apparatus and method for dynamically detecting improper configuration data provided in a network.

BACKGROUND

Various communication networks, such as data networks, often dynamically provide configuration data to various devices operating in the networks. For example, a bootstrap protocol (BootP) server is often used to distribute network addresses and other information to devices operating in a network. As a particular example, processing facilities are often managed using process control systems. Example processing facilities include manufacturing plants, chemical plants, crude oil refineries, and ore processing plants. Among other operations, process control systems typically manage the use of motors, valves, and other industrial equipment in the processing facilities. In a conventional process control system, a BootP server can be used to distribute Internet Protocol (IP) addresses and other configuration data to controllers and other devices in the process control system.

SUMMARY

This disclosure provides an apparatus and method for dynamically detecting improper configuration data provided in a network.

In a first embodiment, a method includes transmitting one or more requests for configuration data over a network. The method also includes receiving one or more responses from one or more sources of configuration data, where each of the responses contains configuration data. In addition, the method includes generating a notification indicating whether a problem associated with the one or more sources of configuration data is detected based on the one or more responses.

In particular embodiments, multiple responses from multiple sources of configuration data are received. Also, the notification is generated indicating a problem is detected based on a determination that the configuration data in one response from one source of configuration data is inconsistent with the configuration data in another response from another source of configuration data. The responses could, for example, contain different Internet Protocol (IP) addresses and/or different Network Timing Protocol (NTP) parameters.

In other particular embodiments, multiple responses from multiple sources of configuration data are received. Also, the notification is generated indicating that no problem is detected based on a determination that the configuration data in one response from one source of configuration data is consistent with the configuration data in another response from another source of configuration data.

In yet other particular embodiments, the notification is generated indicating that a problem is detected based on a determination that multiple responses from multiple sources of configuration data have been received.

In still other particular embodiments, the notification is generated indicating that no problem is detected based on a determination that a response from a single source of configuration data has been received.

In additional particular embodiments, the notification is generated indicating that a problem is detected based on a determination that no responses from any sources of configuration data have been received.

In a second embodiment, an apparatus includes at least one network interface configured to transmit one or more requests for configuration data over a network and to receive one or more responses from one or more sources of configuration data. Each of the responses contains configuration data. The apparatus also includes at least one processor configured to generate a notification indicating whether a problem associated with the one or more sources of configuration data is detected based on the one or more responses.

In a third embodiment, a computer program is embodied on a computer readable medium. The computer program includes computer readable program code for initiating transmission of one or more requests for configuration data over a network. The computer program also includes computer readable program code for receiving one or more responses. The one or more responses are provided by one or more sources of configuration data, and each of the responses contains configuration data. The computer program further includes computer readable program code for generating a notification indicating whether a problem associated with the one or more sources of configuration data is detected based on the one or more responses.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

Figure 1:
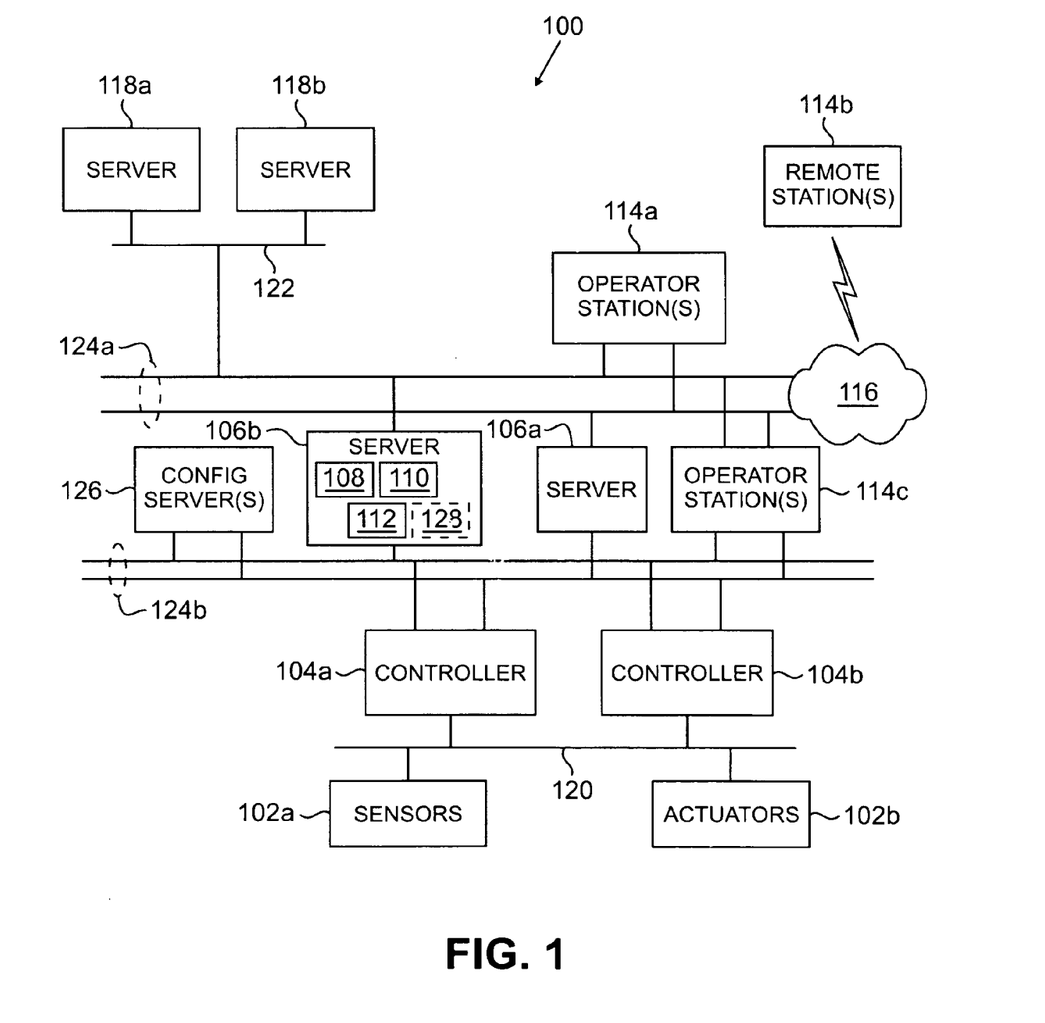
FIG. 1 illustrates an example process control system in which improper configuration data is detected.

FIG. 1 illustrates an example process control system 100 in which improper configuration data is detected. The embodiment of the process control system 100 shown in FIG. 1 is for illustration only. Other embodiments of the process control system 100 may be used without departing from the scope of this disclosure.

In this example embodiment, the process control system 100 includes various components that facilitate production or processing of at least one product or material, such as one or more sensors 102*a* and one or more actuators 102*b*. The sensors 102*a* and actuators 102*b* represent components in a process or production system that may perform any of a wide variety of functions. For example, the sensors 102*a* could measure a wide variety of characteristics in the process control system 100, such as temperature, pressure, or flow rate. Also, the actuators 102*b* can perform a wide variety of operations that alter the characteristics being monitored by the sensors 102*a*. As particular examples, the actuators 102*b* could represent heaters, motors, catalytic crackers, or valves. The sensors 102*a* and actuators 102*b* could represent any other or additional components in any suitable process or production system. Each of the sensors 102a includes any suitable structure for measuring one or more characteristics in a process or production system. Each of the actuators 102b includes any suitable structure for operating on or affecting conditions in a process or production system.

Two controllers 104a-104b are coupled to the sensors 102a and actuators 102b. The controllers 104a-104b may, among other things, use the measurements from the sensors 102a to control the operation of the actuators 102b. For example, the controllers 104a-104b could receive measurement data from the sensors 102a and use the measurement data to generate control signals for the actuators 102b. Each of the controllers 104a-104b includes any hardware, software, firmware, or combination thereof for interacting with the sensors 102a and controlling the actuators 102b. The controllers 104a-104b could, for example, represent multivariable controllers or other types of controllers that implement control logic (such as logic associating sensor measurement data to actuator control signals) to operate. As a particular example, each of the controllers 104a-104b could represent a computing device running a MICROSOFT WINDOWS operating system.

Two servers 106a-106b are coupled to the controllers 104a-104b. The servers 106a-106b perform various functions to support the operation and control of the controllers 104a-104b, sensors 102a, and actuators 102b. For example, the servers 106a-106b could log information collected or generated by the controllers 104a-104b, such as measurement data from the sensors 102a or control signals for the actuators 102b. The servers 106a-106b could also execute applications that control the operation of the controllers 104a-104b, thereby controlling the operation of the actuators 102b. In addition, the servers 106a-106b could provide secure access to the controllers 104a-104b.

In some embodiments, the servers 106a-106b may represent a redundant pair of servers. For example, one server 106a could operate as a primary server and communicate with the controllers 104a-104b. The other server 106b could act as a backup server that maintains synchronization with the primary server 106a and that takes over operations if and when the primary server 106a becomes unavailable. Each of the servers 106a-106b may repeatedly switch between the primary and secondary roles as operations in the system 100 occur over time.

Each of the servers 106a-106b includes any hardware, software, firmware, or combination thereof for providing access to, control of, or operations related to the controllers 104a-104b. For example, each of the servers 106a-106b may include one or more processors 108, one or more memories 110 storing instructions and data used, generated, or collected by the processor(s) 108, and one or more network interfaces 112. As a particular example, each of the servers 106a-106b could represent a computing device running a MICROSOFT WINDOWS operating system. Also, as a particular example, the network interfaces 112 could include one or more Ethernet interfaces. The one or more processors 108 in each of the servers 106a-106b could execute any suitable instructions, such as by executing an EXPERION PKS application from HONEYWELL INTERNATIONAL INC.

One or more operator stations 114a-114b are coupled to the servers 106a-106b, and one or more operator stations 114c are coupled to the controllers 104a-104b. The operator stations 114a-114b represent computing or communication devices providing user access to the servers 106a-106b, which could then provide user access to the controllers 104a-104b (and possibly the sensors 102a and actuators 102b). The operator stations 114c represent computing or communication devices providing direct user access to the controllers 104a-104b. As particular examples, the operator stations 114a-114c could allow users to review the operational history of the sensors 102a and actuators 102b using information collected by the controllers 104a-104b and/or the servers 106a-106b. The operator stations 114a-114c could also allow the users to adjust the operation of the sensors 102a, actuators 102b, controllers 104a-104b, or servers 106a-106b. In addition, the operator stations 114a-114c could receive and display warnings, alerts, or other messages or displays generated by the controllers 104a-104b or the servers 106a-106b. Each of the operator stations 114a-114c includes any hardware, software, firmware, or combination thereof for supporting user access and control of the system 100. In particular embodiments, each of the operator stations 114a-114c could represent a computing device running a MICROSOFT WINDOWS operating system.

In this example, at least one of the operator stations 114b is remote from the servers 106a-106b. The remote station is coupled to the servers 106a-106b through a network 116, and the remote station could communicate with the network 116 over a wired or wireless connection. The network 116 facilitates communication between various components in the system 100. For example, the network 116 may communicate Internet Protocol (IP) packets, frame relay frames, Asynchronous Transfer Mode (ATM) cells, or other suitable information between network addresses. The network 116 may include one or more local area networks (LANs), metropolitan area networks (MANs), wide area networks (WANs), all or a portion of a global network such as the Internet, or any other communication system or systems at one or more locations.

In this example, the system 100 includes two additional servers 118a-118b. The servers 118a-118b execute various applications to control the overall operation of the system 100. For example, the system 100 could be used in a processing or production plant or other facility, and the servers 118a-118b could execute applications used to control the plant or other facility. As particular examples, the servers 118a-118b could execute applications such as enterprise resource planning (ERP), manufacturing execution system (MES), or any other or additional plant or process control applications. Each of the servers 118a-118b includes any hardware, software, firmware, or combination thereof for controlling the overall operation of the system 100.

As shown in FIG. 1, the system 100 includes various single networks 120 and 122 and redundant networks 124a-124b that support communication between components in the system 100. Each of these networks 120, 122, 124a-124b represents any suitable network or combination of networks facilitating communication between components in the system 100. As particular examples, the network 120 could represent an Ethernet network, an electrical signal network (such as a HART or FOUNDATION FIELDBUS network), a pneumatic control signal network, or any other or additional type of network. Also, the network 122 could represent an Ethernet network, and each of the networks 124a-124b could represent a redundant pair of Ethernet networks.

One or more configuration servers 126 are also present in the process control system 100. The configuration servers 126 distribute configuration data to other devices in the process control system 100. For example, a configuration server 126 could monitor communications on a network and detect requests for configuration data. As a particular example, the configuration server 126 could monitor communications on the network 124b to detect requests for IP address resolutions. The configuration server 126 can also provide the requested configuration data to the appropriate devices, such as by providing an IP network address and/or Network Timing Protocol (NTP) configuration data to a requesting device (like a controller). Each configuration server 126 includes any hardware, software, firmware, or combination thereof for providing configuration data to one or more components in the system 100. As particular examples, each configuration server 126 could represent a bootstrap protocol (BootP) server or a dynamic host configuration protocol (DHCP) server, although any other or additional protocol(s) could be used to request and/or provide configuration data. In this document, the phrase "configuration data" refers to data provided to a component to configure that component in some manner, including addressing information (such as network addresses), network timing data, and other data.

In general, any number of configuration servers 126 could be present in the process control system 100. In some embodiments, it may be desired that a single configuration server 126 provide all configuration data to components in the system 100. In other embodiments, it may be desired that multiple configuration servers 126, such as a pair of configuration servers 126, provide configuration data to components in the system 100. Whatever the expected or desired arrangement, however, there may arise problems with one or more configuration servers 126 in the system 100. For example, there may be cases where multiple configuration servers 126 are present in the system 100, such as when a configuration server 126 is inadvertently added to the system 100.

In these or other situations, one or more configuration servers 126 could provide conflicting or incorrect configuration data to a component in the system 100. For example, a controller could receive the wrong network address from one configuration server 126, while an operator of the system 100 expected the controller to receive its network address from a different configuration server 126. As a particular example, a request for configuration data could be made when a device (such as a controller) boots from power up or reboots while power is applied. While these circumstances may seem to be controlled, a power failure could cause an unexpected reboot, followed by a new request for configuration data. If an inappropriate configuration server 126 exists and responds before the correct configuration server 126, this may result in improper operation of the system 100, including loss of expected communications in the system 100. As another example, if different DHCP servers are assigned different ranges of IP addresses, the different DHCP servers could provide different IP addresses to requesting devices, making communications random or not at all successful in the system 100. As yet another example, a configuration server 126 could go offline in the system 100, such as due to a power failure or other problem. This could prevent a controller or other component from obtaining necessary configuration data.

These or other types of situations could lead to various problems in the process control system 100. For example, this could lead to a loss of control or a loss of view over a controller and may require a reboot of the controller (and even a reboot of the controller may not resolve this problem). As a particular example, problems may occur during the flash reprogramming of controllers in the process control system 100, where the problems are caused by configuration servers 126 providing incorrect configuration data to a controller being reprogrammed.

The presence of these or other types of situations in the process control system 100 may not even be known to an operator of the system 100. This could occur, for example, when an application executed in the process control system 100 includes a BootP or DHCP server without the operator's knowledge. This could also occur when a user's computing device is coupled to a network in the system 100 and includes a BootP or DHCP server. In addition, different releases of applications executed in the process control system 100 may provide different versions of BootP or DHCP servers, and the different versions of the BootP or DHCP servers may operate in incompatible ways.

In accordance with this disclosure, a configuration monitoring tool 128 can be provided on one or more components in the system 100. The tool 128 could, for example, be implemented on, executed by, or otherwise provided by the secondary or backup server in a redundant server pair (such as server 106b in this example), although the tool 128 could actually reside on multiple components (such as on both servers 106a-106b). Among other things, the tool 128 may repeatedly send out a request for configuration data onto a network, such as by broadcasting an IP address resolution request on the network 124b. Zero, one, or multiple configuration servers 126 may receive the request and respond with appropriate configuration data. The tool 128 may collect and analyze any responses from the configuration servers 126 to determine if a problem exists in the process control system 100. As particular examples, the tool 128 could indicate that no problems are present when a single configuration server 126 responds to a request. The tool 128 could also generate an alert, error message, or other notification when no configuration servers 126 respond, when multiple configuration servers 126 respond, or when multiple configuration servers 126 respond with different configuration data.

In some embodiments, the tool 128 could transmit multiple requests and collect responses to those requests before analyzing the responses and determining if an error is present. This may be useful, for example, when a configuration server 126 does not or cannot respond to an initial request from the tool 128 (such as when the configuration server 126 was busy performing other actions or the first request was lost due to network congestion). In particular embodiments, the number of requests sent and the time interval between requests could be established or controlled by a user. Also, the operation of the tool 128 could be continuous or intermittent. The tool 128 could, for example, operate continuously or at specified intervals of time. In particular embodiments, the tool 128 could operate as a WINDOWS service, be manually executed, or be scheduled as a periodic task.

The use of the tool 128 may provide various benefits in the process control system 100. For example, the tool 128 may help to identify abnormal or undesirable situations involving one or more configuration servers 126 in the process control system 100. Among other things, this may help to avoid problems caused by configuration servers 126 providing incorrect or conflictin g configuration data to components in the system 100. This may also allow appropriate personnel to take corrective action (such as disabling or reconfiguring one or more of the configuration servers 126) before problems with components in the system 100 actually occur, such as before incorrect configuration data is provided to a controller in the system 100.

Additional details regarding the use and operation of the tool 128 are provided below. The tool 128 includes any hardware, software, firmware, or combination thereof for receiving and analyzing configuration data to identify one or more improper conditions associated with the configuration data. The tool 128 could, for example, represent a software application executed by one or more computing devices.

Although FIG. 1 illustrates one example of a process control system 100 in which improper configuration data is detected, various changes may be made to FIG. 1. For example, a control system could include any number of sensors, actuators, controllers, servers, operator stations, networks, and configuration monitoring tools. Also, the makeup and arrangement of the process control system 100 is for illustration only. Components could be added, omitted, combined, or placed in any other suitable configuration according to particular needs. As a particular example, the configuration server(s) 126 may reside at any suitable location(s) in the system 100, and a configuration server 126 may reside within another component in the system 100 (such as within an operator station, server, or other device). In addition, FIG. 1 illustrates one operational environment in which a configuration monitoring mechanism can be used to detect improper configuration data. The configuration monitoring mechanism could be used in any other suitable device or system, including other process control systems and non-process control systems (such as in data networks or other communication networks).

FIGS. 2 through 7 illustrate example graphical displays associated with the detection of improper configuration data provided in a network. The embodiments of the graphical displays shown in FIGS. 2 through 7 are for illustration only. Other graphical displays or other mechanisms could be used to interact with a user without departing from the scope of this disclosure. Also, for ease of explanation, the graphical displays shown in FIGS. 2 through 7 are described with respect to the configuration monitoring tool 128 operating in the process control system 100 of FIG. 1. The graphical displays could be used with any suitable configuration monitoring tool operating in any suitable process control or non-process control system or network.

Figure 2:
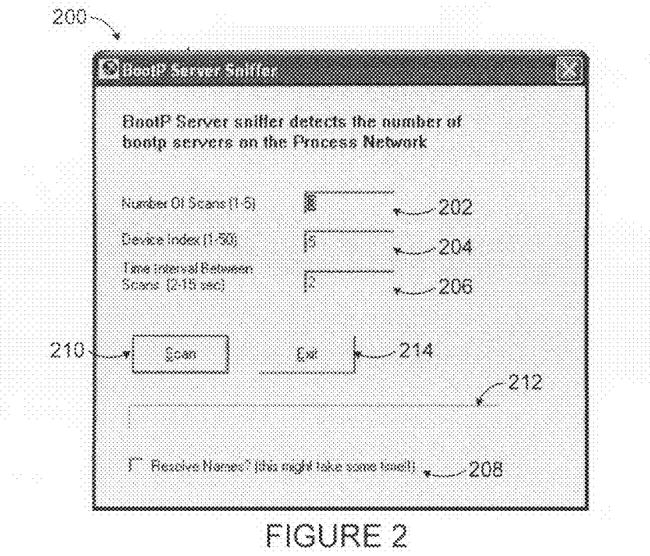
FIGS. 2 through 7 illustrate example graphical displays associated with the detection of improper configuration data provided in a network.

As shown in FIG. 2, a display 200 can be used to configure the configuration monitoring tool 128. For example, text boxes 202-206 and a checkbox 208 allow a user to set different options associated with the configuration monitoring tool 128. In this example, the text box 202 allows a user to specify a "number of scans" performed by the tool 128. The "number of scans" value represents the number of times that a request for configuration data is transmitted by the tool 128 over a network during a single scanning routine. As a particular example, the number of scans could be set to three, which causes the tool 128 to transmit three requests and collect responses to those requests before the responses are analyzed. Among other things, this may help to capture a response from a configuration server 126 that was busy when a prior request was received by that configuration server 126. While the "number of scans" value here is limited to between one and five, this is an example only.

The text box 204 allows a user to specify a "device index" value associated with the tool 128. The "device index" value can be used by the configuration server(s) 126 to generate configuration data for the tool 128. For example, the base network address for a group of components in the system 100 could be "10.1.2.0," and a configuration server 126 could be configured to use this base address. When a component requests configuration data, the component may include its "device index" value in an IP address resolution request or other request. The configuration server 126 could receive this request, identify the component's "device index" value, and add the component's "device index" value to the last digit in the base address to generate the network address for that component. As a particular example, the tool 128 could have a "device index" value of five, and the configuration server 126 could provide the tool 128 with configuration data that includes a network address of "10.1.2.5" (10.1.2.0+5). The text box 204 allows a user to manually configure the "device index" value of the tool 128, which could allow the user to specify a "device index" value not in use by other components. While the "device index" value here is limited to between one and fifty, this is an example only. Also, a configuration server 126 could operate without requiring a "device index" value from the tool 128, and the text box 204 could be omitted.

The text box 206 allows a user to specify a "time interval" between transmissions of configuration data requests by the tool 128. As noted above, the tool 128 could transmit multiple requests and collect responses to those multiple requests before analyzing the responses during a single analysis of the system 100. The "time interval" value in the text box 206 identifies the amount of time between transmissions of the requests. This "time interval" value could also represent the amount of time that the tool 128 waits to receive responses from any configuration servers 126 after the transmission of a request by the tool 128 (although this type of time-out or other value could be specified in any other suitable manner). In some embodiments, the text box 206 may be inaccessible to the user when the user places a value of one in the text box 202 (indicating that only one request will be transmitted). While the "time interval" value here is limited to between two and fifteen seconds, this is an example only.

The checkbox 208 allows a user to control whether machine names of responding configuration servers 126 are displayed to the user. For example, after configuration data is requested by the tool 128, the tool 128 may receive responses from one or multiple configuration servers 126. Each configuration server 126 may be identified by its network address, such as an IP address, at the tool 128. However, a machine name assigned to the one or more responding configuration servers 126 may or may not be identified and displayed by the tool 128 (depending on whether the checkbox 208 is selected). Resolving network addresses into machine names could be a lengthy process, such as when numerous configuration servers 126 send responses to the tool 128. As a result, the user can be given the option of skipping the name resolution operation via the checkbox 208.

A scan button 210 can be selected by a user to initiate a scanning routine by the tool 128. For example, selection of the scan button 210 could cause the tool 128 to begin transmitting requests for configuration data onto a network and collecting and analyzing any responses. During a single scanning routine, the tool 128 could transmit the number of requests identified in the text box 202. The requests may contain the value identified in the text box 204, and the requests may be separated by a time interval identified in the text box 206. The tool 128 could also analyze any responses received from one or more configuration servers 126 and generate a display (such as one of the displays shown in FIGS. 3 through 7) to identify the results of the analysis.

A progress bar 212 indicates the extent to which a scanning routine has been completed. During the scanning routine, text can be inserted under the progress bar to identify the current operation being performed by the tool 128. For example, the text could state "Scanning Pass xx" (where xx represents the number of requests transmitted by the tool 128 up to that point during the scanning routine). The text could also state "Please wait . . . resolving machine names" during machine name resolution. Any other or additional text could be displayed to the user during the scanning routine.

An exit button 214 allows a user to stop the current scanning routine being performed by the tool 128 and/or to exit the tool 128. When the exit button 214 is selected, the tool 128 may or may not display any results obtained thus far during a scanning routine to the user.

Depending on the responses collected by the configuration monitoring tool 128 during a scanning routine, the tool 128 can generate an appropriate display identifying the scanning results for a user. Examples of these displays are shown in FIGS. 3 through 7. However, the configuration monitoring tool 128 could report the results of a scanning routine in any other suitable manner, which may or may not include the generation of a graphical display for a user.

Figure 3:
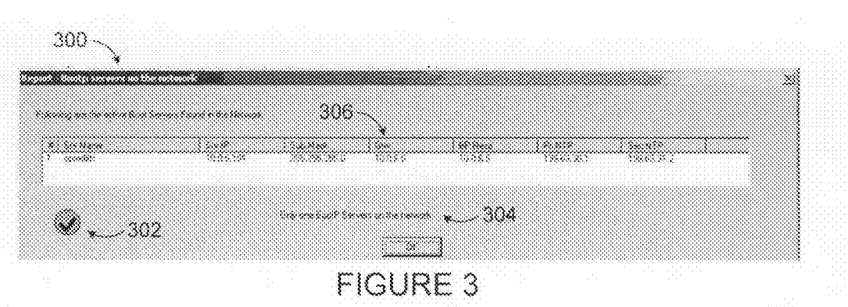

If the configuration monitoring tool 128 identifies only one configuration server 126 during a scanning routine, the tool 128 could generate and present a display 300 as shown in FIG. 3. In this example, the display 300 includes a visual indicator 302, which indicates that no problems were detected. The display 300 also includes a note 304, which states that only one configuration server 126 (such as one BootP or DHCP server) was found during the scan of the network.

The display 300 further includes a table 306, which contains information associated with the configuration servers 126 identified during the scanning routine (which in this case is one server 126). In this example, the table 306 includes various information about the identified configuration server 126. For example, the table 306 identifies a machine name (Srv Name) associated with the configuration server 126. The machine name may or may not be available in the table 306, depending on whether the name resolution option is enabled or disabled via the checkbox 208. The table 306 also identifies the network address (Srv IP), submask address (Sub Mask), and gateway address (Gtw) associated with the configuration server 126. In addition, the table 306 identifies the configuration data provided by the configuration server 126. In this example, the configuration data includes a network address assigned to the tool 128 by the configuration server 126 (BP Resp), a primary NTP server address assigned to the tool 128 by the configuration server 126 (Pri NTP), and a secondary NTP server address assigned to the tool 128 by the configuration server 126 (Sec NTP).

In this example, only one configuration server 126 was located during the scanning routine performed by the tool 128, and the configuration data provided by that configuration server 126 is displayed in the table 306 to allow for user review. Because only a single configuration server 126 was located during the scanning routine, the tool 128 uses the visual indicator 302 to indicate that no problems have been detected. In this case, there is no concern about multiple configuration servers 126 existing in the system 100 and providing conflicting configuration data.

Figure 4:
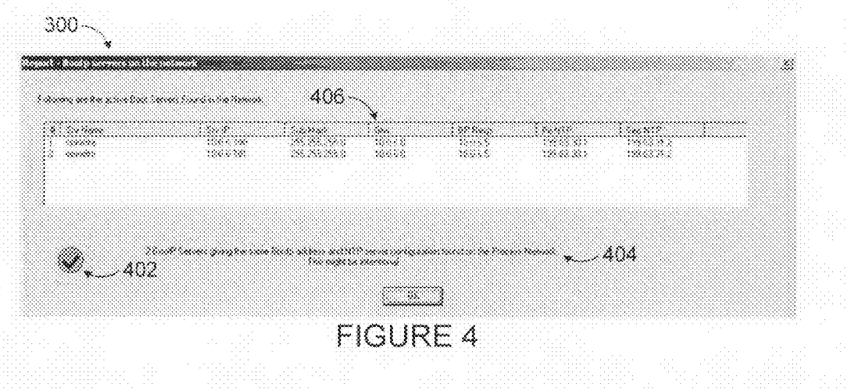

If the configuration monitoring tool 128 identifies multiple configuration servers 126 that provide consistent configuration data during a scanning routine, the tool 128 could generate and present a display 400 as shown in FIG. 4. In this example, the display 400 includes a visual indicator 402 indicating that no problems were detected. The display 400 also includes a note 404, which states that multiple configuration servers 126 (such as multiple BootP or DHCP servers) were located during the scanning routine and that the configuration servers 126 provided consistent configuration data. In addition, the display 400 includes a table 406, which contains information associated with the two configuration servers 126 identified during the scanning routine.

In this example, two configuration servers 126 were located during the scanning routine, and the configuration data provided by the two configuration servers 126 is displayed in the table 406. The presence of multiple configuration servers 126 could be cause for concern since this raises the possibility of multiple configuration servers 126 distributing incorrect or conflicting configuration data to components of the system 100. However, it is possible that multiple configuration servers 126 are desired and used in the system 100. In these cases, the multiple configuration servers 126 should distribute consistent configuration data. As shown in the table 406 of FIG. 4, the configuration data from the two configuration servers 126 is consistent. Namely, in this example, the two configuration servers 126 provide consistent network addresses and primary and secondary NTP server configuration data. Because the configuration data is consistent, the visual indicator 402 indicates that no problems were detected. In other embodiments, the mere presence of multiple configuration servers 126 could trigger an alert or warning, and the visual indicator 402 and the note 404 could be changed to indicate that a problem was detected and to identify the problem (multiple configuration servers were detected).

Figure 5:
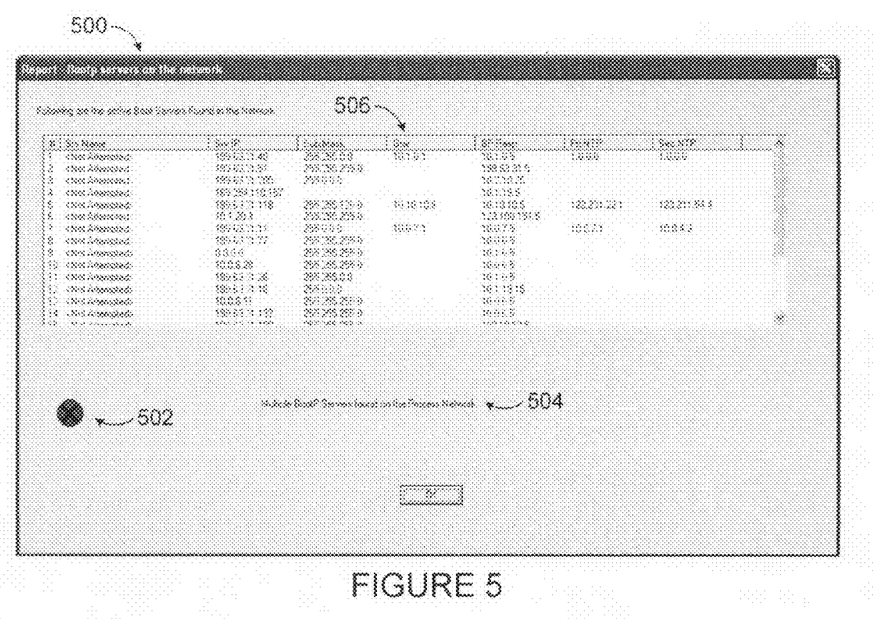
Figure 6:
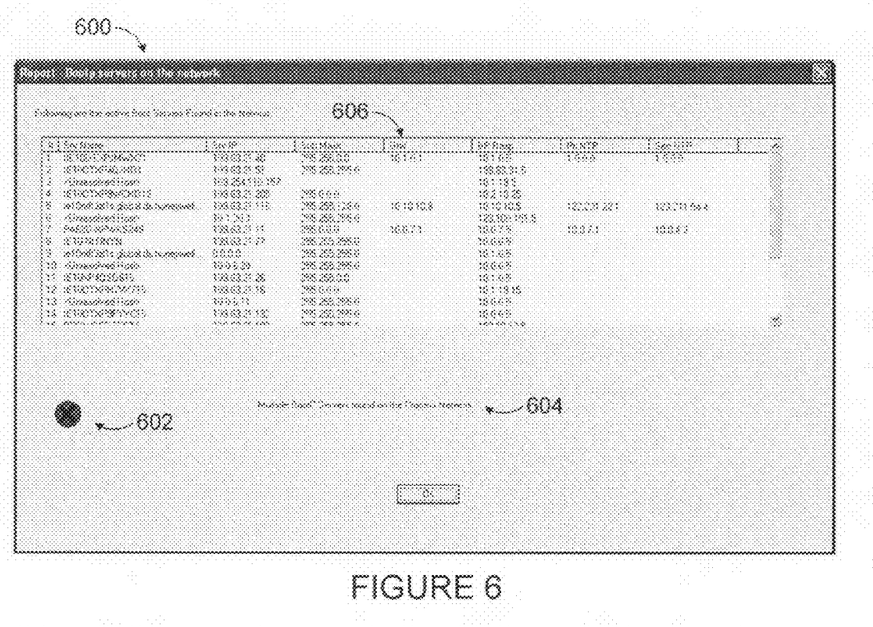

If the configuration monitoring tool 128 identifies multiple configuration servers 126 that provide inconsistent information during a scanning routine, the tool 128 could generate and present a display 500 as shown in FIG. 5 and/or a display 600 as shown in FIG. 6. In FIG. 5, a visual indicator 502 indicates that a problem has been detected, and a note 504 generally identifies the problem. A table 506 identifies various information associated with the identified configuration servers 126, although the machine names of the configuration servers 126 have been omitted (which may occur when the checkbox 208 is not selected). As shown in FIG. 6, a visual indicator 602 indicates that a problem has been detected, and a note 604 generally identifies the problem. A table 606 also identifies various information associated with the identified configuration servers 126, including the machine names of the configuration servers 126 (which may occur when the checkbox 208 is selected).

As shown in FIGS. 5 and 6, the configuration data provided by multiple configuration servers 126 (as displayed in the tables 506 and 606) is different. For example, the network addresses and primary and secondary NTP server configuration data are different. This could cause various problems in the process control system 100. For example, a controller could be set up based on an engineer's assumption that the controller would receive its configuration data from a particular configuration server 126. The presence of multiple configuration servers 126 distributing configuration data raises the possibility that the controller could receive incorrect configuration data from a different configuration server 126. This could seriously interfere with the operation of the controller in the process control system 100. By displaying the identified configuration servers 126 and the configuration data provided by those servers 126, an engineer or other personnel could take appropriate steps to resolve any possible problems, such as by deactivating or reconfiguring one or more of the identified configuration servers 126.

While FIG. 5 has been described as being displayed when the checkbox 208 is not selected and FIG. 6 has been described as being displayed when the checkbox 208 is selected, a combination of these displays could be presented to a user. For example, the display 500 could initially be displayed to the user, and the machine names in the display 500 could be populated as shown in FIG. 6 as the machine names are resolved.

Figure 7:
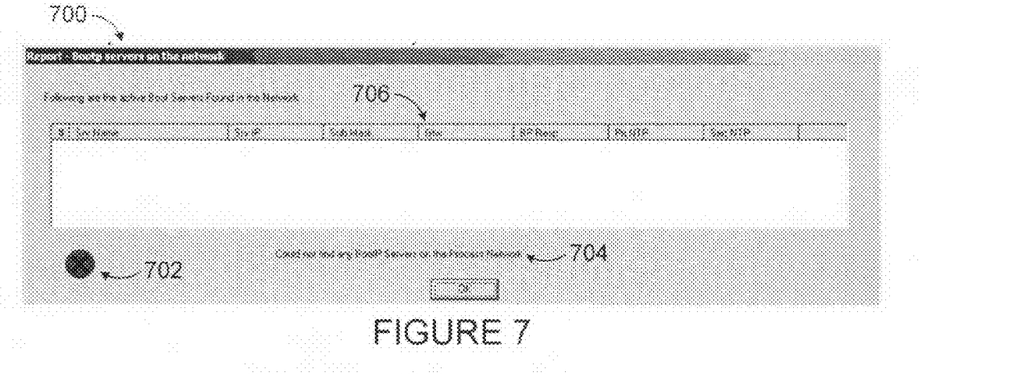

Another problem that can occur in the process control system 100 is the complete absence of configuration servers 126. This could occur, for example, if a configuration server 126 goes offline due to a power failure, hardware failure, or other condition. If the configuration monitoring tool 128 identifies no configuration servers 126 during a scanning routine, the tool 128 could generate and present a display 700 as shown in FIG. 7. In FIG. 7, a visual indicator 702 indicates that a problem has been detected, and a note 704 generally identifies the problem (in this example, no configuration servers were detected). A table 706 is empty since no configuration servers 126 were identified.

The various displays 200-700 shown in FIGS. 2 through 7 could be generated and presented to a user in any suitable manner. For example, the tool 128 could use an application programming interface (API), such as an HSC server interface (denoted HSCCLI) to raise alarms and events with an EXPERION PKS server from HONEYWELL INTERNATIONAL INC. In some embodiments, the tool 128 could be running in the background as a periodic task or as a service, and the API or other mechanism could be used to immediately raise an alarm or error message when an invalid configuration is detected.

Although FIGS. 2 through 7 illustrate examples of graphical displays associated with the detection of improper configuration data provided in a network, various changes may be made to FIGS. 2 through 7. For example, the content and arrangement of each of the displays 200-700 are for illustration only. Each of the displays 200-700 could include any suitable information in any suitable arrangement. Also, more or less information could be displayed depending on particular needs. As particular examples, the table of identified configuration servers 126 could be omitted when no problems are detected, or the table could be hidden and made available upon selection of a button, link, or other mechanism. As another particular example, help information could be provided to the user when the tool 128 identifies one or more problems in a network or when an error occurs during execution of the tool 128.

Figure 8:
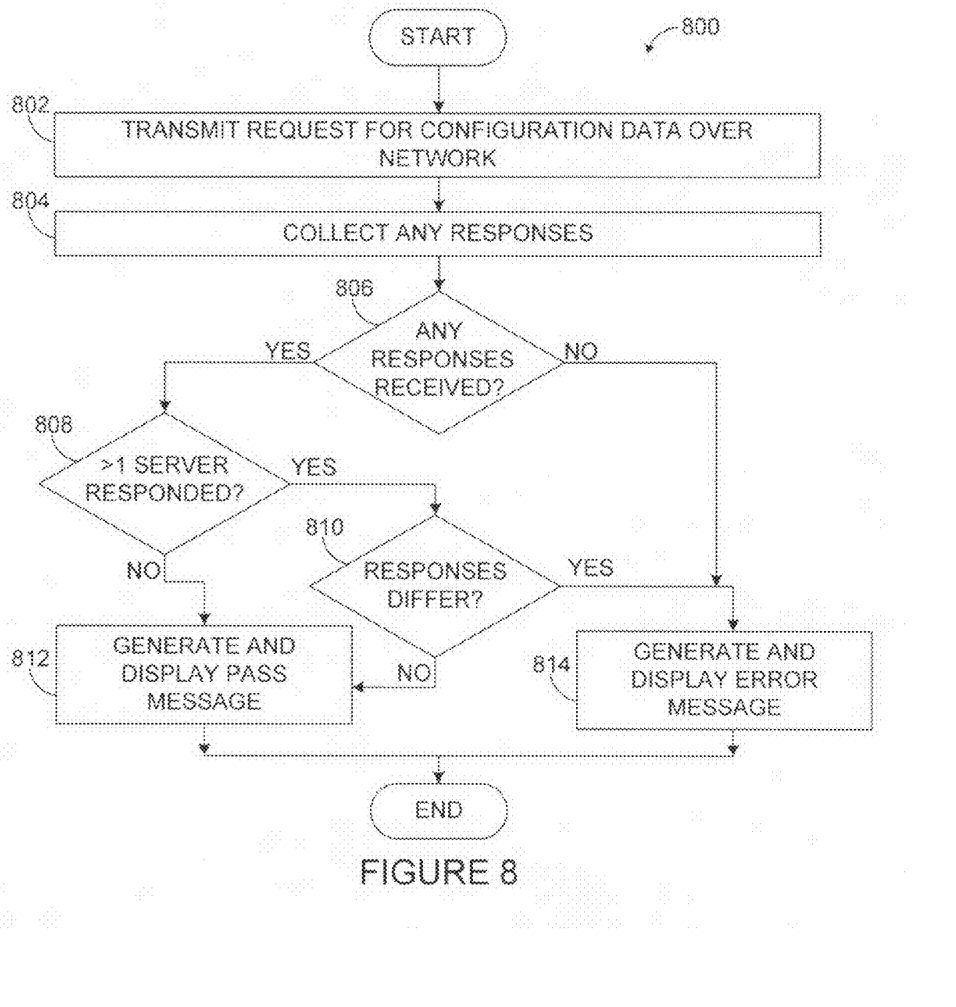
FIG. 8 illustrates an example method for detecting improper configuration data provided in a network.

FIG. 8 illustrates an example method 800 for detecting improper configuration data provided in a network. The embodiment of the method 800 shown in FIG. 8 is for illustration only. Other embodiments of the method 800 could be used without departing from the scope of this disclosure. Also, for ease of explanation, the method 800 shown in FIG. 8 is described with respect to the configuration monitoring tool 128 operating in the process control system 100 of FIG. 1. The method 800 could be used with any suitable configuration monitoring tool operating in any suitable process control or non-process control system or network.

A configuration monitoring tool transmits a request for configuration data over a network at step 802. This could include, for example, a server executing the configuration monitoring tool 128 broadcasting an IP address resolution request over the network 124*b*. The configuration monitoring tool 128 could broadcast or otherwise transmit any other suitable request for configuration data, whatever the format of the request.

The configuration monitoring tool collects any responses to the request at step 804. This could include, for example, the configuration monitoring tool 128 waiting for and collecting any responses received within a specified period of time. This period of time represents a window during which valid responses can be received from one or more configuration servers 126. The window could have any suitable length of time, such as a length based on the "time interval" value in the text box 206. During this window, it is possible that zero, one, several, or many responses are received from zero or more configuration servers 126.

If no responses are received from any configuration servers as determined at step 806, the configuration monitoring tool generates and displays an error message at step 814. In this case, no responses were received from any configuration servers 126, and the configuration monitoring tool 128 could cause an error message or other notification to be displayed (such as by presenting the display 700 of FIG. 7). At this point, corrective action could be taken to bring one or more configuration servers 126 online or to otherwise make configuration data available in the network.

If at least one response is received, a determination is made whether responses from multiple configuration servers were received at step 808. If not, this indicates that a single configuration server 126 sent configuration data to the configuration monitoring tool 128. In this case, the configuration monitoring tool generates and displays a pass message at step 812. In this case, no problems have been detected, and the configuration monitoring tool 128 could cause a pass message or other notification to be displayed (such as by presenting the display 300 of FIG. 3).

If responses from multiple configuration servers were received, the configuration monitoring tool determines whether the responses contain different configuration data at step 810. If not, this indicates that multiple configuration servers 126 sent configuration data to the configuration monitoring tool 128, but the configuration data was consistent. In this case, the configuration monitoring tool generates and displays the pass message at step 812. In this case, no problems have been detected, and the configuration monitoring tool 128 could cause a pass message or other notification to be displayed (such as by presenting the display 400 of FIG. 4).

If the responses from multiple configuration servers contain different configuration data, this indicates that multiple inconsistent responses were received from multiple configuration servers 126. In this case, the configuration monitoring tool generates and displays the error message at step 814. The configuration monitoring tool 128 could cause an error message or other notification to be displayed (such as by presenting the display 500 of FIG. 5 and/or the display 600 of FIG. 6). At this point, corrective action could be taken to reduce or prevent the transmission of incorrect or conflicting configuration data by the configuration servers 126.

Although FIG. 8 illustrates one example of a method 800 for detecting improper configuration data provided in a network, various changes may be made to FIG. 8. For example, the configuration monitoring tool 128 could transmit multiple requests and receive multiple responses from a configuration server 126 during a scanning routine. When this occurs, the configuration monitoring tool 128 could verify that the responses contain the same configuration data and, if so, treat the responses from that configuration server 126 as a single response. As another example, the configuration monitoring tool 128 could treat the presence of multiple configuration servers 126 as an error (regardless of whether the servers provide consistent configuration data). In these embodiments, the "yes" branch from step 808 could lead directly to step 814.

In some embodiments, various functions described above are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory.

It may be advantageous to set forth definitions of certain words and phrases used throughout this patent document. The term "couple" and its derivatives refer to any direct or indirect communication between two or more elements, whether or not those elements are in physical contact with one another.

The terms "application" and "program" refer to one or more computer programs, software components, sets of instructions, procedures, functions, objects, classes, instances, related data, or a portion thereof adapted for implementation in a suitable computer code (including source code, object code, or executable code). The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. The term "controller" means any device, system, or part thereof that controls at least one operation. A controller may be implemented in hardware, firmware, software, or some combination of at least two of the same. The functionality associated with any particular controller may be centralized or distributed, whether locally or remotely.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:
   transmitting one or more requests for configuration data over a network, the one or more requests transmitted to one or more configuration servers that are operable to provide configuration data to one or more components;
   receiving one or more responses from the one or more configuration servers, each of the responses containing configuration data;
   determining whether a problem associated with the one or more configuration servers is detected based on the one or more responses; and
   generating a notification indicating any detected problem associated with the one or more configuration servers based on the determination;
   wherein determining whether the problem is detected includes determining whether the configuration data for a specified one of the components received from a first of the configuration servers is different than the configuration data for the specified component received from a second of the configuration servers.

2. The method of claim 1, wherein the specified component comprises a configuration monitoring tool that performs the transmitting, receiving, determining, and generating steps.

3. The method of claim 1, wherein determining whether the configuration data from the first configuration server is different than the configuration data from the second configuration server comprises determining whether the responses contain at least one of: different Internet Protocol (IP) addresses and different Network Timing Protocol (NTP) parameters.

4. The method of claim 1, determining whether the problem is detected further includes determining that no problem is detected when the configuration data in the response from the first configuration server is consistent with the configuration data in the response from the second configuration server.

5. The method of claim 1, wherein determining whether the problem is detected further includes determining that the problem is detected based on a determination that multiple responses from multiple configuration servers have been received.

6. The method of claim 1, wherein determining whether the problem is detected further includes determining that no problem is detected based on a determination that a response from a single configuration server has been received.

7. The method of claim 1, further comprising generating the notification indicating that the problem is detected based on a determination that no responses from any configuration servers have been received in response to a second request.

8. The method of claim 1, wherein:
   transmitting the one or more requests comprises transmitting multiple requests; and
   receiving the one or more responses comprises receiving one or more responses within a specified time period after each request transmission.

9. The method of claim 8, wherein a number of requests transmitted and a time interval between requests are specified by a user.

10. The method of claim 1, wherein:
    the one or more requests comprise requests for address resolution;
    the one or more configuration servers comprise at least one of: one or more bootstrap protocol servers and one or more dynamic host configuration protocol servers; and
    the notification comprises a graphical display.

11. An apparatus comprising:
    at least one network interface configured to transmit one or more requests for configuration data over a network and to receive one or more responses from one or more configuration servers that are operable to provide configuration data to one or more components, each of the responses containing configuration data; and
    at least one processor configured to determine whether a problem associated with the one or more configuration servers is detected based on the one or more responses and to generate a notification indicating any detected problem associated with the one or more configuration servers based on the determination;
    wherein the at least one processor is configured to determine whether the problem is detected by determining whether the configuration data for a specified one of the components received from a first of the configuration servers is different than the configuration data for the specified component received from a second of the configuration servers.

12. The apparatus of claim 11, wherein the specified component comprises the apparatus.

13. The apparatus of claim 11, wherein the at least one processor is further configured to determine that no problem is detected based on a determination that the configuration data in the response from the first configuration server is consistent with the configuration data in the response from the second configuration server.

14. The apparatus of claim 11, wherein the at least one processor is further configured to determine that the problem is detected based on a determination that multiple responses from multiple configuration servers have been received.

15. The apparatus of claim 11, wherein the at least one processor is further configured to generate the notification indicating that the problem is detected based on a determination that no responses from any configuration servers have been received in response to a second request.

16. The apparatus of claim 11, wherein the at least one processor is further configured to determine that no problem is detected based on a determination that a response from a single configuration server has been received.

17. The apparatus of claim 16, wherein the at least one processor is configured to treat multiple responses from the single configuration server as a single response.

18. The apparatus of claim 11, wherein:
the at least one processor is configured to initiate transmission of multiple requests for configuration data; and
a number of requests transmitted and a time interval between requests are specified by a user.

19. A computer readable medium embodying a computer program, the computer program comprising:
computer readable program code for initiating transmission of one or more requests for configuration data over a network to one or more configuration servers that are operable to provide configuration data to one or more components;
computer readable program code for receiving one or more responses, the one or more responses provided by the one or more configuration servers, each of the responses containing configuration data;
computer readable program code for determining whether a problem associated with the one or more configuration servers is detected based on the one or more responses; and
computer readable program code for generating a notification indicating any detected problem associated with the one or more configuration servers based on the determination;
wherein the computer readable program code for determining whether the problem is detected includes computer readable program code for determining whether the configuration data for a specified one of the components received from a first of the configuration servers is different than the configuration data for the specified component received from a second of the configuration servers.

20. The computer readable medium of claim 19, wherein the computer readable medium forms a portion of the specified component.

21. The computer program of claim 19, wherein the computer readable program code for determining whether the problem is detected further includes:
computer readable program code for determining that no problem is detected when the configuration data in the response from the first configuration server is consistent with the configuration data in the response from the second configuration server.

22. The computer program of claim 19, wherein the computer readable program code for determining whether the problem is detected further includes:
computer readable program code for determining that the problem is detected when multiple responses from multiple configuration servers have been received.

23. The computer program of claim 19, wherein the computer readable program code for determining whether the problem is detected further includes:
computer readable program code for determining that no problem is detected when a response from a single configuration server has been received.

24. The computer program of claim 19, wherein the computer readable program code for determining whether the problem is detected further includes:
computer readable program code for determining that the problem is detected when no responses from any configuration servers has been received in response to a second request.

* * * * *